US012239596B2

(12) United States Patent
Kim

(10) Patent No.: US 12,239,596 B2
(45) Date of Patent: Mar. 4, 2025

(54) SKIN MASSAGE TOOL

(71) Applicant: PAUCO PAN UNIVERSE COSMETICS CO., LTD., Incheon (KR)

(72) Inventor: Seok Rin Kim, Seoul (KR)

(73) Assignee: PAUCO PAN UNIVERSE COSMETICS CO., LTD., Incheon (KR)

( * ) Notice: Subject to any disclaimer, the term of this patent is extended or adjusted under 35 U.S.C. 154(b) by 591 days.

(21) Appl. No.: 17/330,701

(22) Filed: May 26, 2021

(65) Prior Publication Data

US 2022/0110824 A1 Apr. 14, 2022

(30) Foreign Application Priority Data

Oct. 13, 2020 (KR) ........................ 10-2020-0131746

(51) Int. Cl.
*A61H 15/00* (2006.01)

(52) U.S. Cl.
CPC . *A61H 15/0092* (2013.01); *A61H 2015/0042* (2013.01); *A61H 2201/0153* (2013.01)

(58) Field of Classification Search
CPC .... A61H 7/007; A61H 15/00; A61H 15/0092; A61H 2015/0014; A61H 2015/0042; A61H 2201/0107; A61H 2201/0157; A61H 2201/0153
USPC ................................................ D24/214, 215
See application file for complete search history.

(56) References Cited

U.S. PATENT DOCUMENTS

| | | | | | |
|---|---|---|---|---|---|
| 2,011,471 | A * | 8/1935 | Casagrande | A61H 15/0092 | 601/129 |
| 2,836,175 | A * | 5/1958 | Nakayama | A61H 7/003 | 601/135 |
| D422,084 | S * | 3/2000 | Mickelson | D24/214 | |
| D865,985 | S * | 11/2019 | Matsushita | D24/211 | |
| 2006/0069333 | A1* | 3/2006 | Pidcock | A61H 15/00 | 601/123 |
| 2008/0058687 | A1* | 3/2008 | Cheng | A61H 7/007 | 601/123 |
| 2009/0234182 | A1* | 9/2009 | Buchholz | A61H 19/00 | 705/40 |

(Continued)

FOREIGN PATENT DOCUMENTS

| | | |
|---|---|---|
| JP | 3216328 U | 5/2018 |
| KR | 10-1772844 B1 | 8/2017 |
| KR | 10-2018-0109661 A | 10/2018 |

*Primary Examiner* — Colin W Stuart
*Assistant Examiner* — Douglas Y Sul
(74) *Attorney, Agent, or Firm* — NKL LAW; Jae Youn Kim

(57) ABSTRACT

A skin massage tool is proposed. The skin massage tool includes: a handle; and a roller assembly combined with the handle and having a pair of shafts which branch off and a pair of massage balls rotatably joined to the shafts, wherein the roller assembly includes a body joined to one end of the handle and a pair of shafts bent downwards and backwards from the body. The shafts of the roller assembly are bent in a downwardly backward direction of the handle, an angle between a pair of the shafts is in the range from 107° to 117°, and an angle between the handle and the shafts is in the range from 50° to 60°. Therefore, the skin massage tool can enhance a massaging effect and a lifting effect to lift up the sagging skin of the face.

3 Claims, 7 Drawing Sheets

(56) References Cited

U.S. PATENT DOCUMENTS

| | | | | |
|---|---|---|---|---|
| 2013/0030332 | A1* | 1/2013 | Ingrassia | A61H 7/002<br>601/19 |
| 2014/0288473 | A1* | 9/2014 | Matsushita | A61H 7/007<br>601/137 |
| 2017/0065481 | A1* | 3/2017 | Matsushita | A61H 15/0092 |
| 2019/0350793 | A1* | 11/2019 | Wersland | A61H 23/006 |
| 2021/0022949 | A1* | 1/2021 | Janapol | A61H 23/0263 |
| 2022/0339060 | A1* | 10/2022 | Paget | C08L 75/04 |

* cited by examiner

SKIN MASSAGE TOOL

CROSS-RFERENCES TO RELATED APPLICATIONS

This application claims priority to and the benefit of Korean Patent Application No. 10-2020-0131746, filed on Oct. 13, 2020, the disclosure of which is incorporated herein by reference in its entirety.

BACKGROUND OF THE INVENTION

Field of the Invention

The present invention relates to a skin massage tool, and more particularly, to a skin massage tool, which includes a handle and a pair of roller assemblies branching off from an end portion of the handle in a downwardly backward direction of the handle, thereby enhancing a lifting effect of the face more conveniently.

Background Art

In general, a skin massage tool is a skin care tool for massaging the skin of a face, arms, legs and others with rotary power of a ball when a user puts the ball to the user's skin. The skin massage tool includes a handle, and a pair of rollers disposed at an end of the handle. The user grasps the handle, and massages the skin while moving the rollers getting in contact with the skin, so that the skin is contracted and stretched out between the rollers.

As an example of such a massage tool, Korean Patent No. 10-1772844 discloses a skin massage tool. In Korean Patent No. 10-1772844, the skin massage tool includes: a handle having a boss shaft, which protrudes from one side of a body and has a shaft fitting groove having a rotation preventing jaw; a shaft having a boss insertion part, which has a rotation preventing side, is formed at one side and is inserted into the shaft fitting groove, and a bushing fitting part formed at the other side to have a diameter smaller than that of the boss insertion part, and spiral grooves formed on both sides; a bushing assembled when the bushing fitting part of the shaft is inserted into the bushing, the bushing having a roller seating surface formed on the outer circumferential surface; a shaft fixing screw coupled to the spiral groove of the boss insertion part inserted into the shaft fitting groove inside the handle; a roller assembly having a mounting hole, which has an inner diameter larger than that of a boss shaft of the handle, and a guide roller formed on the inner surface of the mounting hole and put on the roller seating surface of the bushing; and a bushing fixing screw coupled to the spiral groove of the bushing fitting part to fix the bushing on which the guide roller is disposed. The roller assembly includes: a ball base having a through hole formed therein, a roller blocking jaw protruding from the hole to be stepped, and a magnet insertion groove formed on the outer circumferential surface; a guide roller which is inserted into a through hole of a ball base and is caught to the roller blocking jaw to be located in the middle of the ball base; a magnet member fixed and mounted in the magnet insertion groove of the ball base; and a ball housing formed to surround both sides of the guide roller and the outer circumferential surface of the ball base in order to have a mounting hole having an inner diameter larger than that of the boss shaft of the handle.

Therefore, the conventional skin massage tool has several advantages in that it is easy to assemble and replace the roller assembly mounted on the handle of the skin massage tool, in that it improves blood circulation since a permanent magnet is buried in the roller assembly, and in that it improves a skin massaging effect using a concavo-convex surface.

The conventional skin massage tool has an 'Y'-shaped structure that the ball housing branches in a longitudinal direction, namely, forwards. In case that the user has a massage along his or her jawline, the skin between the massage balls is stretched out during an upward movement of the massage balls but is contracted during a downward movement. So, the conventional skin massage tool has a disadvantage in that a skin lifting effect to pull the sagging skin is insignificant.

SUMMARY OF THE INVENTION

Accordingly, the present invention has been made to solve the above-mentioned problems occurring in the prior arts, and it is an object of the present invention to provide a skin massage tool which is bent in a downwardly backward direction of a handle and has massage balls, thereby enhancing a skin lifting effect and allowing a user to have a massage conveniently.

To accomplish the above object, according to the present invention, there is provided a skin massage tool including: a handle; and a roller assembly combined with the handle and having a pair of shafts which branch off and a pair of massage balls rotatably joined to the shafts, wherein the roller assembly includes a body joined to one end of the handle and a pair of shafts bent downwards and backwards from the body.

In this instance, the handle is formed in a bar shape with a predetermined length and has a combining protrusion formed at an end thereof, the body of the roller assembly has a fixing hole into which the combining protrusion is inserted, a combining ball which is supported by an elastic spring and of which a part of the upper side is exposed externally is disposed on the combining protrusion, and a ball recess with which an upper portion of the combining ball is combined is formed on an upper portion of the inner face of the fixing hole.

Moreover, the massage ball has a shaft combining hole into which the shaft is inserted, and is made of any one among glass stones, organic gemstones, artificial gemstones, and stones.

Furthermore, the shafts of the roller assembly are bent in a downwardly backward direction of the handle, an angle between a pair of the shafts is in the range from 107° to 117°, and an angle between the handle and the shafts is in the range from 50° to 60°.

Additionally, a two-stage fixing recess is formed at the front of the body of the roller assembly combined with the handle, and a two-stage roller assembly is disposed on the two-stage fixing recess. An insertion protrusion joined to the two-stage fixing recess is formed on the two-stage roller assembly, and shafts of the two-stage roller assembly are bent in a downwardly vertical direction or in a downwardly forward direction of the handle.

In addition, a three-stage fixing recess is formed at the front of a body of the two-stage roller assembly, and a three-stage roller assembly is disposed on the three-stage fixing recess. An insertion protrusion joined to the three-stage fixing recess is formed on the three-stage roller assembly, and shafts of the three-stage roller assembly are bent in the downwardly forward direction of the handle.

The skin massage tool according to the present invention can enhance a massage effect, and enhance lifting effect to lift up the sagging skin, especially, the skin of a user's face.

Moreover, the skin massage tool according to the present invention can enhance a massage effect to contract and stretch out the skin since having the multi-stage roller assembly.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Figure 1:
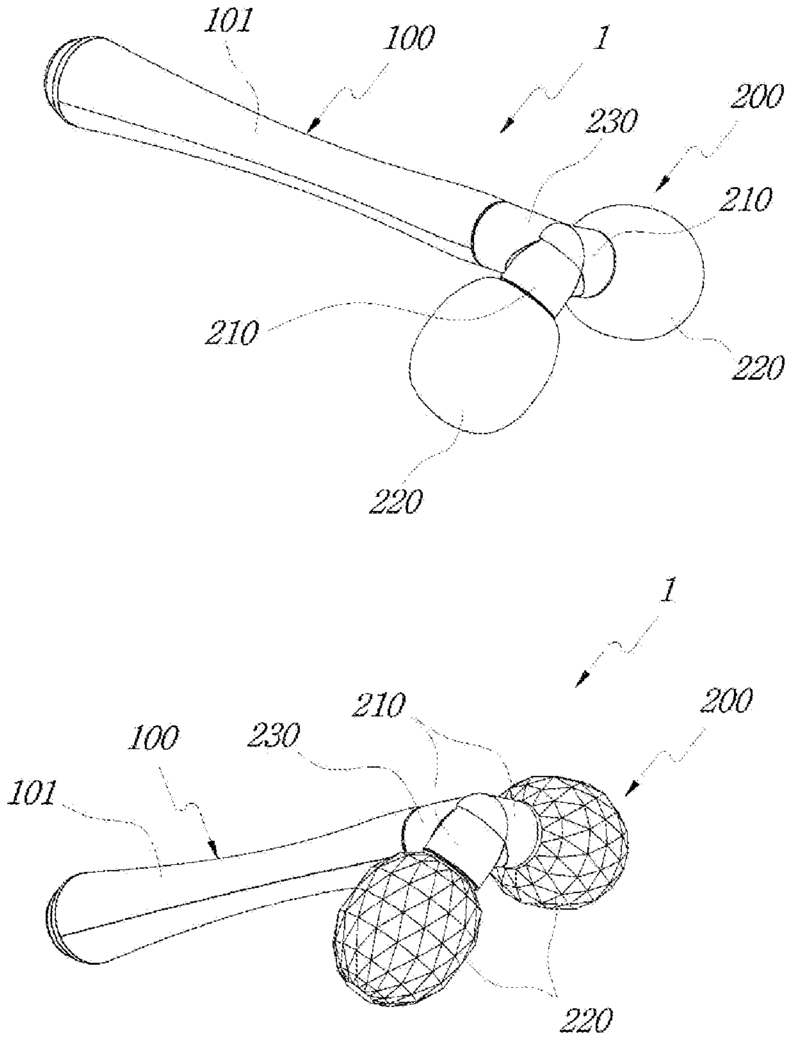
FIG. 1 is a perspective view of a skin massage tool according to an embodiment of the present invention.

Hereinafter, with reference to the attached drawings, example embodiments of a skin massage tool according to the present invention will herein be described in detail. The example embodiments of the present invention may have various modifications and alternative forms, and particular embodiments of the present invention will be illustrated in the attached drawings and described in this specification in detail. It should be understood, however, that there is no intent to limit example embodiments of the invention to the particular forms disclosed, but on the contrary, example embodiments of the invention are to cover all modifications, equivalents, and alternatives falling within the technical idea and scope of the present invention.

A skin massage tool 1 according to the present invention is to massage various body parts, such as a face, arms and legs, with rotational pressurization of massage balls 220, especially, is effective in lifting the sagging skin by moving along the facial jawline.

Furthermore, for convenience's sake, it is understood that a direction to massage after a user grasps a handle 100 with the hand is a longitudinal direction of the handle 100.

As shown in FIGS. 1 to 4, such a skin massage tool 1 includes: a handle 100; and a roller assembly 200 combined with the handle 100 and having a pair of shafts 210 which branch off and a pair of massage balls 220 rotatably joined to the shafts 210, wherein the roller assembly 200 includes a body 230 joined to one end of the handle 100 and a pair of shafts 210 bent downwards and backwards from the body 230.

The conventional skin massage tool, which has the 'Y'-shaped structure that the massage balls branch off in the forward direction of the handle, has the disadvantage in that a lifting effect is insignificant since the skin between the massage balls is stretched out during a forward movement of the massage balls but is contracted during a backward movement. However, because the massage balls 220 of the skin massage tool 1 according to the present invention are formed in the reverse direction of the conventional skin massage tool, the skin massage tool according to the present invention can enhance the lifting effect since the skin is contracted during the forward movement on the contrary to the conventional skin massage tool.

Hereinafter, each of components will be described in detail.

Figure 2:
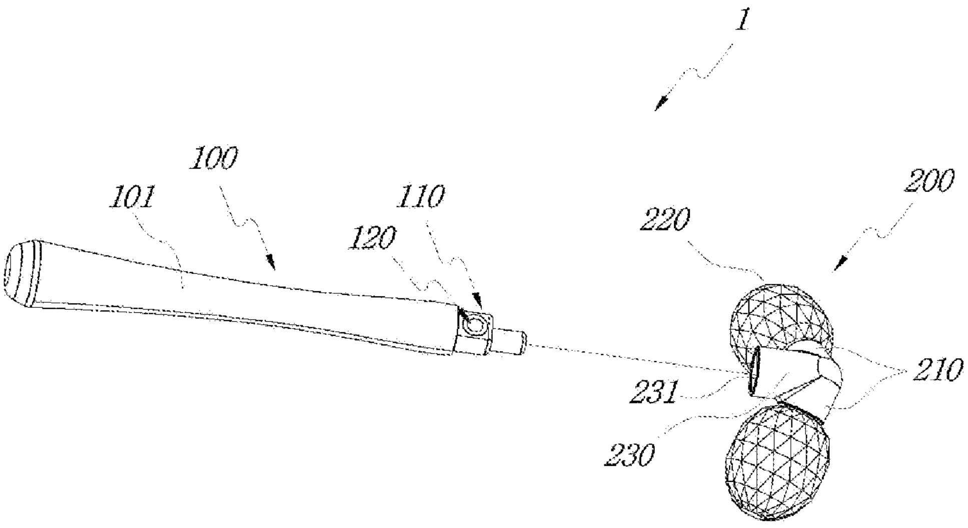
FIG. 2 is an exploded view of the skin massage tool according to the embodiment of the present invention.

First, as shown in FIGS. 1 and 2, the handle 100 is formed in a bar shape with a predetermined length and has a combining protrusion 110 formed at an end thereof. The body 230 of the roller assembly 200 has a fixing hole 231 into which the combining protrusion 110 is inserted. A combining ball 123 which is supported by an elastic spring 122 and of which a part of the upper side is exposed externally is disposed on the combining protrusion 110, and a ball recess 231*a* with which an upper portion of the combining ball 123 is combined is formed on an upper portion of the inner face of the fixing hole 231.

In this instance, a main body 101 of the handle 100 is formed in a cylindrical body that a diameter of a central portion is smaller than that of both ends so that a user can grasp it easily. The combining protrusion 110 is formed from the main body 101 of the handle 100 into a multi-stage cylinder shape and is inserted into the fixing hole 231 of the roller assembly 200. Of course, the fixing hole 231 may be a multi-stage hole with the same form as the combining protrusion 110.

Figure 3:
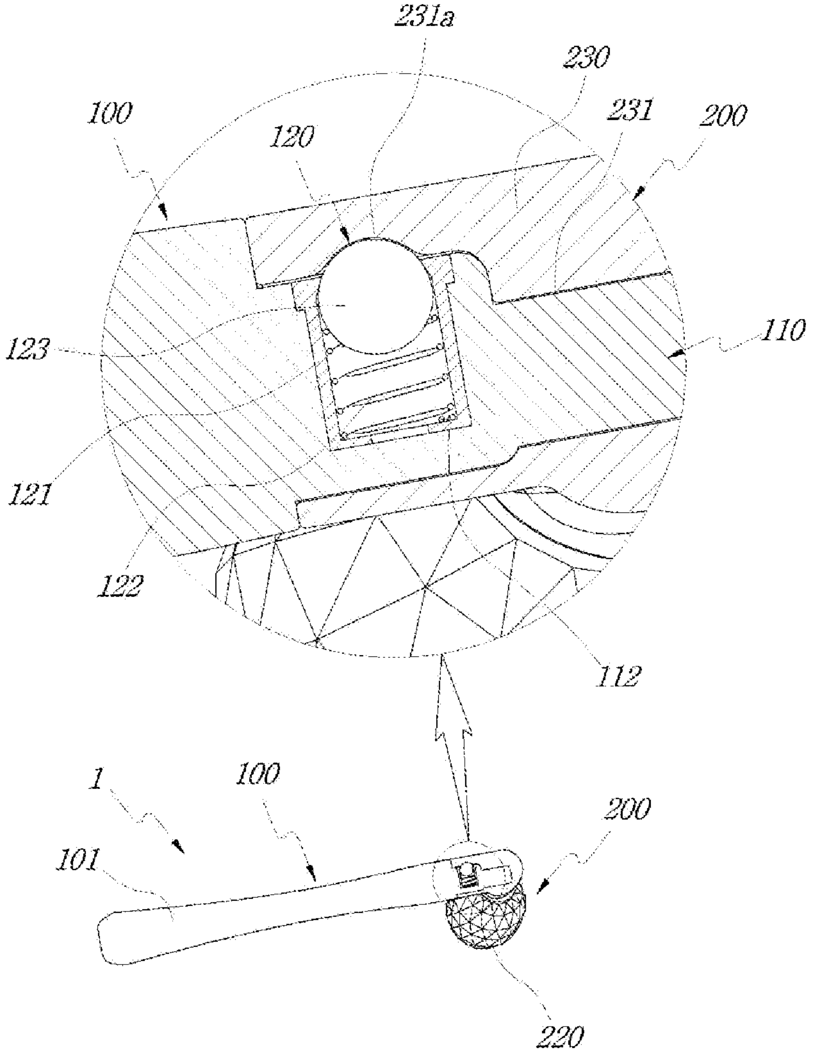
FIGS. 3 and 4 are sectional views of essential parts of the skin massage tool according to the embodiment of the present invention.

Moreover, as shown in FIG. 3, a fixing part 120 for fixing the handle 100 and the roller assembly 200 is formed on the upper side of the combining protrusion 110. The fixing part 120 includes a ball fixture of a cylindrical body disposed in a fixing part recess 112 formed on an upper portion of the combining protrusion 110, and the combining ball 123 supported by the elastic spring 122 disposed on the ball fixture 121. The upper end of the ball fixture 121 protrudes inwards so as to prevent the combining ball 123 from being separated by externally pressing force of the elastic spring 122.

Therefore, when the combining protrusion 110 is inserted into the fixing hole 231, the upper portion of the combining ball 123 is pressed by an inner wall of the fixing hole 231 and is moved downwards. When the combining ball 123 is located on the ball recess 231*a*, the combining ball 123 is fixed conveniently since being restored to its original state by pressure of the elastic spring 122 under the condition that the combining ball 123 is seated on the ball recess 231*a*.

Of course, the combination of the handle 100 and the roller assembly 200 can be achieved by well-known various technologies.

Figure 4:
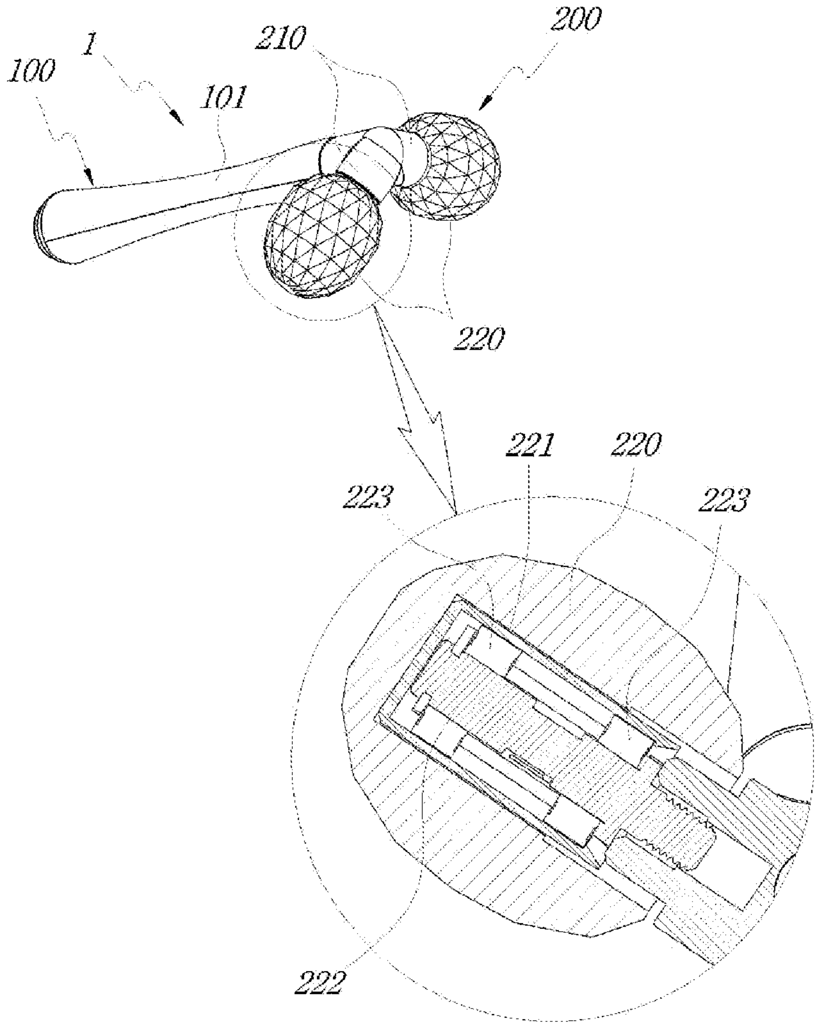

Moreover, as shown in FIG. 4, the shafts 210 and massage balls 220 rotatably combined with the shafts 210 can be also achieved by well-known technologies. For instance, the massage ball 220 may have a shaft combining hole 221 formed at one side thereof, a bearing 223 disposed on the shaft combining hole 221, and a connection shaft 222 having a screw thread formed on one side so that the shaft 210 is screw-coupled with the connection shaft 222.

Furthermore, preferably, the massage ball 220 has a cross section of an oval ball shape in order to widen an area getting in contact with the skin. Alternatively, the massage ball 220 may have a plurality of sides formed on the outer circumferential surface thereof.

In the meantime, the massage ball 220 has the shaft combining hole 221 into which the shaft 210 is inserted, and may be made of any one among glass stones, organic gemstones, artificial gemstones, and stones.

That is, the term of "glass stone" is meant to include natural and man-made forms of glass. For instance, the glass stones include but are not limited to agate, alexandrite, amethyst, ametrine, apatite, aventurine, azurite, beintoite, beryl, bloodstone, carnelian, chrysoberyl, chrysocolla, citrine, diamond, diopside, emerald, falcon's eye, fluorite, garnet, heliotrope, hematite, hiddenite, iolite, jade, white jade, jasper, red jasper, labradorite, lapis lazuli, larimar, malachite, marcasite, moonstone, morganite, obsidian, onyx, opal, peridot, quartz, rock crystal, rose quartz, ruby, sapphire, selenite, sodalite, spinel, sunstone, tanzanite, tiger's eye, topaz, tourmaline, turquoise, yogo sapphire, and zircon. In some embodiments, one or more of diamond, hematite, jade, moonstone, rock crystal, ruby or sapphire may be used. In some embodiments, jade is used, including green jade, white jade, and/or colored jade in other embodiments, rock crystal may be used. Regardless of the choice of gemstone, any color or quality may be used.

Additionally, the organic gemstones include but are not limited to abalone, amber, ammolite, copal, coral, ivory, jet, pearl, and nacre. In some embodiments, pearl may be used.

The artificial gemstones include but are not limited to, cubic zirconia, moissanite, synthetic diamond, synthetic ruby, synthetic sapphire, synthetic emerald, and composite gemstones.

The stones, other than gemstones listed above, include but are not limited to stones or rocks such as soapstone, granite, marble, river rock, river stones, pebbles, metallic stone/ores (germanium for example), volcanic stone, engineered/composite stone, or synthetic stone.

In addition, engineered, composite or artificial stones can be made from one or more stones or stone powders which are bound together. As an example, concrete is made with aggregate stone material and binders. Concrete can be formed into many shapes via molding, cutting, grinding, etc., and even polished. Other engineered, composite, and artificial stones are readily available, or can be custom made with stone materials of choice.

Figure 5:
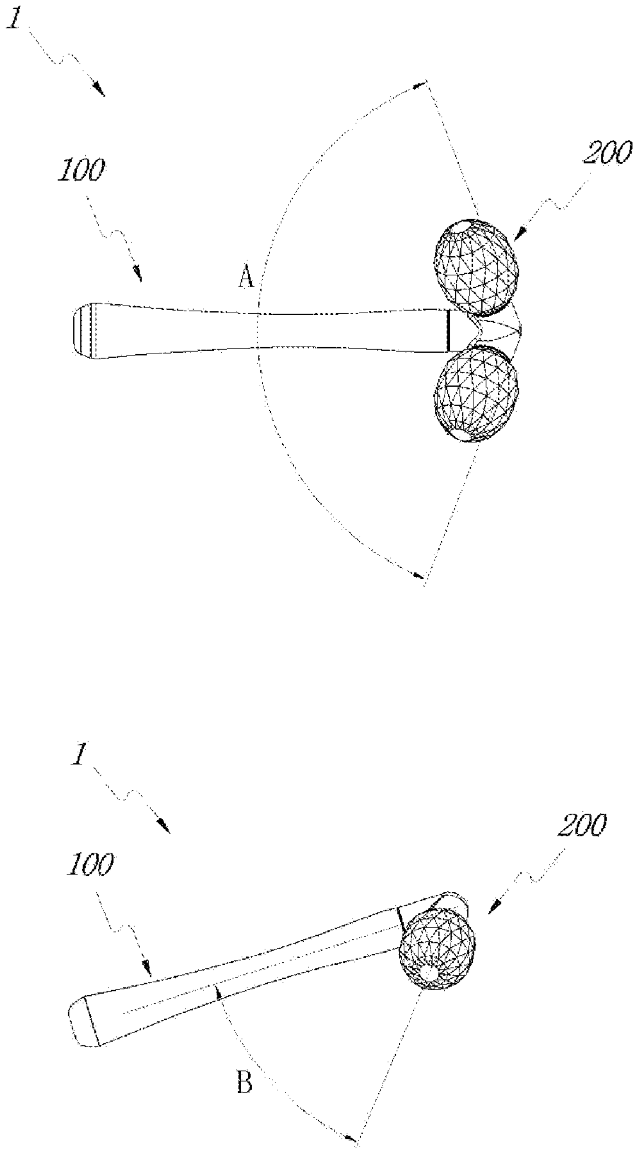
FIG. 5 is a view showing angles of components of the skin massage tool according to the embodiment of the present invention.

Meanwhile, as shown in FIG. 5, the shafts 210 of the roller assembly 200 are bent in a downwardly backward direction of the handle 100, an angle (A) between a pair of the shafts 210 is in the range from 107° to 117°, and an angle (B) between the handle 100 and the shafts 210 is in the range from 50° to 60°.

Figure 6:
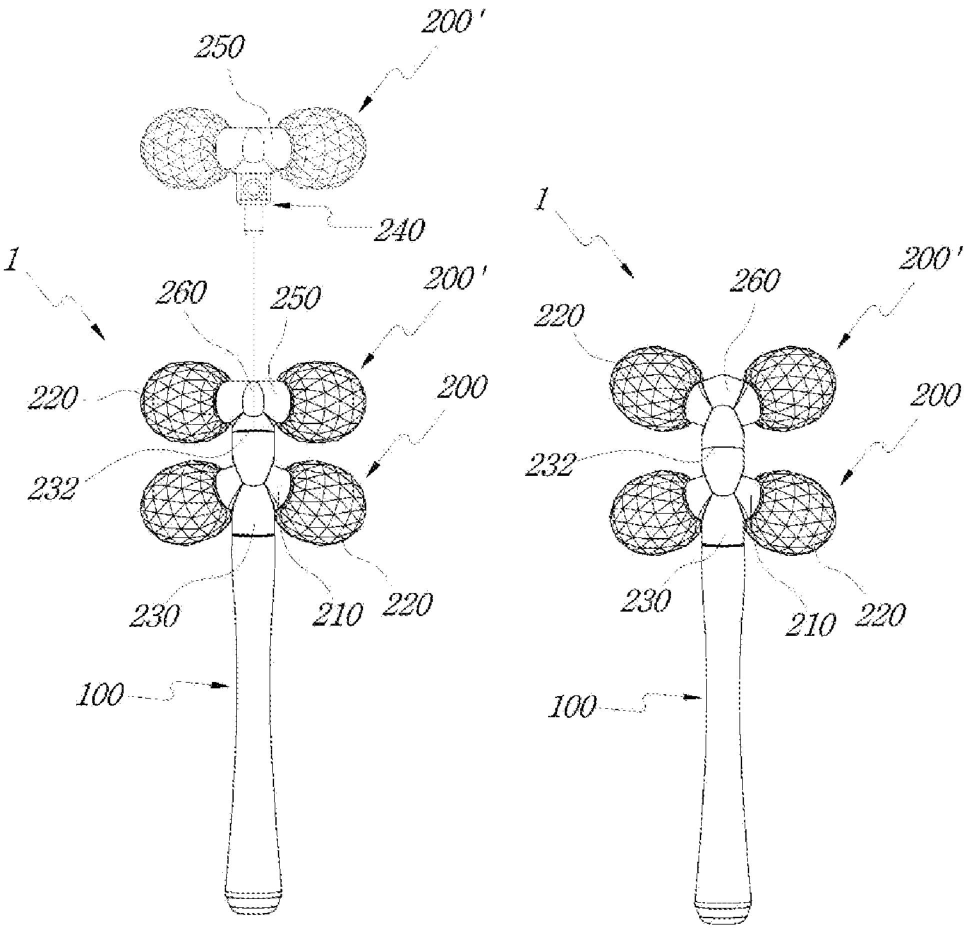
FIG. 6 is a view of a skin massage tool according to another embodiment of the present invention.

Moreover, as shown in FIG. 6, a two-stage fixing recess 232 is formed at the front of the body 230 of the roller assembly 200 combined with the handle 100, and a two-stage roller assembly 200' is disposed on the two-stage fixing recess 232.

Furthermore, an insertion protrusion 240 joined to the two-stage fixing recess 232 is formed on the two-stage roller assembly 200', and shafts 250 of the two-stage roller assembly 200' are bent in a downwardly vertical direction or in a downwardly forward direction of the handle 100.

In the meantime, the two-stage roller assembly 200' is bent in the downwardly vertical direction of the handle 100 or in the downwardly forward direction of the handle 100 to be symmetrical with the roller assembly 200 so that the skin continues stretch and contraction while the skin massage tool 1 moves forwards or backwards or so that the skin massage tool 1 can massage a wider area with less movement. Therefore, the skin massage tool 1 according to the present invention can enhance a lifting effect and a massaging effect.

Figure 7:
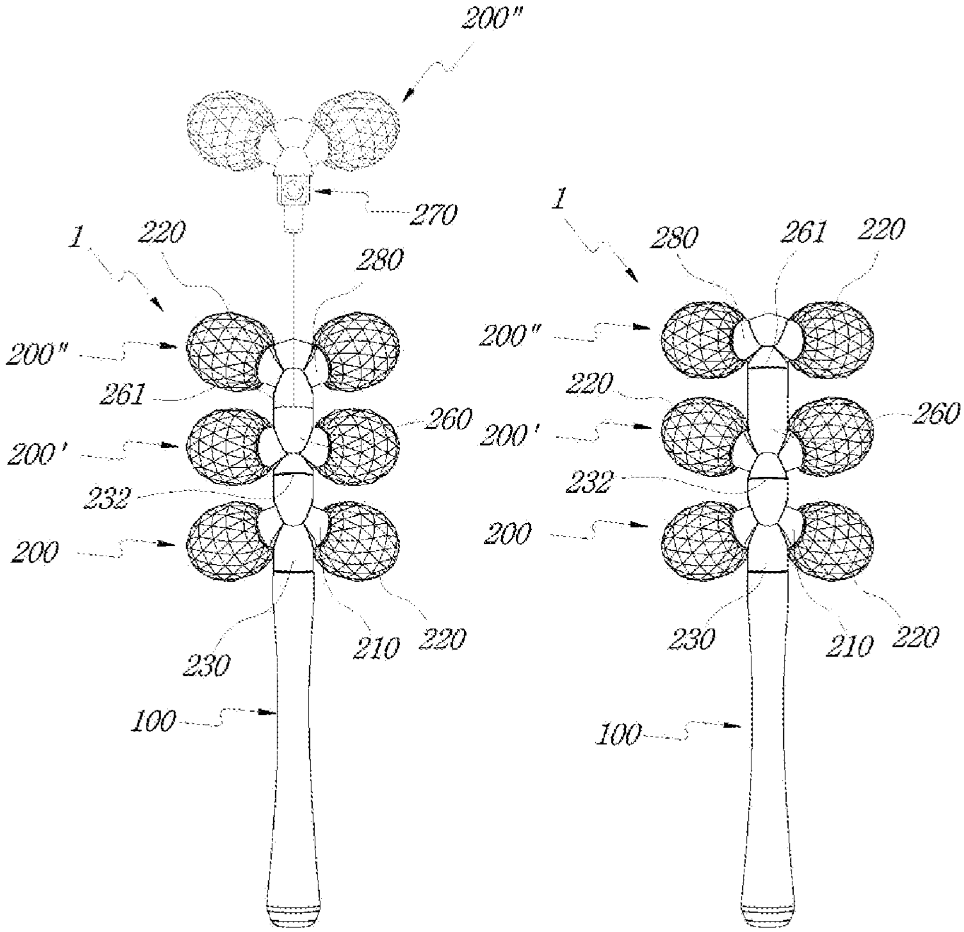
FIG. 7 is a view of a skin massage tool according to a further embodiment of the present invention

In addition, as shown in FIG. 7, a three-stage fixing recess 261 is formed at the front of a body 260 of the two-stage roller assembly 200', and a three-stage roller assembly 200" is disposed on the three-stage fixing recess 261. An insertion protrusion 270 joined to the three-stage fixing recess 261 is formed on the three-stage roller assembly 200", and shafts 280 of the three-stage roller assembly 200" are bent in the downwardly forward direction of the handle 100.

Therefore, the three-stage roller assembly 200" can be coupled into the same structure as the two-stage roller assembly 200' is coupled to the roller assembly, and a pair of shafts 280 branch off in the downwardly forward direction of the handle 100 so as to be symmetrical to the roller assembly 200.

As described above, the massage balls 220 are disposed on a plurality of the roller assemblies 200 at different bending angles so as to be connected to the roller assembly conveniently. Therefore, the skin massage tool according to the present invention can enhance the massaging effect.

As described above, while the present invention has been particularly shown and described with reference to the example embodiments thereof, it will be understood by those of ordinary skill in the art that the present invention is not limited by the exemplary embodiments, and various changes, modifications and equivalents may be made in the present invention without departing from the technical scope and idea of the present invention.

What is claimed is:

1. A skin massage tool comprising:

a handle; and a roller assembly coupled to the handle and having a pair of shafts which branch off and a pair of massage balls rotatably joined to the pair of shafts, wherein the roller assembly includes a body joined to one end of the handle, and the pair of shafts is bent downwards and backwards from the body, wherein a two-stage fixing recess is formed at a front of the body of the roller assembly coupled to the handle, a two-stage roller assembly is disposed on the two-stage fixing recess, a three-stage fixing recess is formed at a front of a body of the two-stage roller assembly, a three-stage roller assembly is disposed on the three-stage fixing recess, an insertion protrusion joined to the three-stage fixing recess is formed on the three-stage roller assembly, and shafts of the three-stage roller assembly are bent in a downward forward direction of the handle, wherein the handle is formed in a bar shape and includes a coupling protrusion formed at an end thereof, and the roller assembly further includes a fixing hole into which the coupling protrusion is inserted, wherein the coupling protrusion includes an end portion disposed at the end thereof, and a stepped portion integrally connected to the end portion, wherein the stepped portion comprises a fixing part including a fixing part recess recessed from an upper surface of the stepped portion, a ball fixture disposed inside and fixed into the fixing part recess, a spring disposed inside the ball fixture, and a coupling ball disposed on the spring, an upper portion of the coupling ball being exposed from the ball fixture to engage with a ball recess disposed on the body of the roller assembly, wherein an insertion protrusion joined to the two-stage fixing recess is formed on the two-stage roller assembly, and shafts of the two-stage roller assembly are bent in a downward vertical direction or in the downward forward direction of the handle, and wherein the three-stage roller assembly is couplable in the same structure as the two-stage roller assembly is coupled to the roller assembly such that the three-stage roller assembly is configured to be directly coupled to the roller assembly.

2. The skin massage tool according to claim 1, wherein each of the pair of massage balls has a shaft coupling hole into which each of the pair of shafts is inserted, and is made of one among glass stones, organic gemstones, artificial gemstones, and stones.

3. The skin massage tool according to claim 1, wherein the pair of shafts of the roller assembly is bent in a downward backward direction of the handle, an angle between the pair of the shafts is in the range from 107° to 117°, and an angle between the handle and each of the shafts, respectively, is in the range from 50° to 60°.

* * * * *